(12) United States Patent
Kim et al.

(10) Patent No.: US 10,468,702 B2
(45) Date of Patent: Nov. 5, 2019

(54) COMPOSITE METAL OXIDE PARTICLES AND METHOD FOR MANUFACTURING SAME

(71) Applicant: LG CHEM, LTD., Seoul (KR)

(72) Inventors: Jong Woo Kim, Daejeon (KR); Changseok Ryoo, Daejeon (KR); Gyunjoong Kim, Daejeon (KR); Sanghyeok Im, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 311 days.

(21) Appl. No.: 15/515,539

(22) PCT Filed: Sep. 25, 2015

(86) PCT No.: PCT/KR2015/010251
§ 371 (c)(1),
(2) Date: Mar. 29, 2017

(87) PCT Pub. No.: WO2016/052965
PCT Pub. Date: Apr. 7, 2016

(65) Prior Publication Data
US 2017/0237102 A1 Aug. 17, 2017

(30) Foreign Application Priority Data
Sep. 30, 2014 (KR) .................. 10-2014-0132099

(51) Int. Cl.
*H01M 8/1246* (2016.01)
*H01M 4/485* (2010.01)
(Continued)

(52) U.S. Cl.
CPC .............. *H01M 8/1246* (2013.01); *C01F 5/00* (2013.01); *C01F 11/00* (2013.01); *C01F 11/02* (2013.01);
(Continued)

(58) Field of Classification Search
CPC ............... C01G 15/006; C01P 2002/34; C01P 2002/74; C01P 2002/51; H01M 10/052;
(Continued)

(56) References Cited

U.S. PATENT DOCUMENTS

2010/0028733 A1* 2/2010 Sin Xicola .......... H01M 8/1246
429/442
2017/0222229 A1* 8/2017 Kim ........................ H01M 8/12

FOREIGN PATENT DOCUMENTS

| JP | 2004-33903 A | 12/2004 |
| JP | 2008-501216 A | 1/2008 |
| KR | 10-2005-0021027 A | 3/2005 |

OTHER PUBLICATIONS

Cong et al., "Synthesis and characterization of IT-electrolyte with perovskite structure $La_{0.8}Sr_{0.2}Ga_{0.85}Mg_{0.15}O_{3-[delta]}$ by glycine-nitrate combustion method", Journal of Alloys and Compounds 348 (2003), pp. 325-331.
(Continued)

*Primary Examiner* — Amanda C. Walke
(74) *Attorney, Agent, or Firm* — Birch, Stewart, Kolasch & Birch, LLP

(57) ABSTRACT

The present specification relates to composite metal oxide particles manufactured by reacting two or more metal oxides and a method for manufacturing the same.

9 Claims, 3 Drawing Sheets

(51) Int. Cl.
  *H01M 10/052*   (2010.01)
  *C01F 11/02*    (2006.01)
  *C01F 5/00*     (2006.01)
  *C01F 11/00*    (2006.01)
  *C01F 17/00*    (2006.01)
  *C01G 15/00*    (2006.01)
  *H01M 8/124*    (2016.01)

(52) U.S. Cl.
  CPC .......... *C01F 17/00* (2013.01); *C01F 17/0018* (2013.01); *C01G 15/006* (2013.01); *H01M 4/485* (2013.01); *H01M 10/052* (2013.01); *C01P 2002/34* (2013.01); *C01P 2002/50* (2013.01); *C01P 2002/72* (2013.01); *C01P 2002/74* (2013.01); *C01P 2004/51* (2013.01); *C01P 2004/61* (2013.01); *C01P 2006/40* (2013.01); *H01M 2008/1293* (2013.01); *H01M 2300/0074* (2013.01); *H01M 2300/0091* (2013.01); *Y02E 60/525* (2013.01); *Y02P 70/56* (2015.11)

(58) Field of Classification Search
  CPC ............. H01M 10/0525; H01M 4/485; H01M 8/1246; C01F 17/00; C01F 17/0018; C01F 11/00; C01F 11/02
  USPC ........................................................ 429/495
  See application file for complete search history.

(56) References Cited

OTHER PUBLICATIONS

International Search Report for PCT/KR2015/010251 (PCT/ISA/210) dated Feb. 29, 2016.

Lee et al., "Preparation and characterization of strontium and magnesium doped lanthanum gallates as the electrolyte for IT-SOFC", Journal of Power Sources 166 (2007), pp. 35-40.

Lim et al., "Properties of Low Temperature Sintering of $La_{0.8}Sr_{0.2}Ga_{0.8}Mg_{0.2-x}Zn_xO_{2.8}$ (X=0.0-0.05) Electrolyte", Journal of the Korean Ceramic Society, vol. 51, No. 3, pp. 208-217, 2014.

Liu et al., "Synthesis of Strontium-And Magnesium-Doped Lanthanum Gallate by Glycine-Nitrate Combustion Method", China Particuology, vol. 4, No. 1, pp. 9-12, 2006.

Majewski et al., "Processing of $(La,Sr)(Ga,Mg)O_3$ Solid Electrolyte", Journal of Electroceramics, 8, pp. 65-73, 2002.

Seong et al., "Synthesis and Characterization of LSGM Solid Electrolyte for Solid Oxide Fuel Cell", Journal of the Korean Ceramic Society, vol. 44, No. 12, pp. 696-702, 2007.

Shi et al., "Synthesis and characterization of $La_{0.85}Sr_{0.15}Ga_{0.80}Mg_{0.20}O_{2.825}$ by glycine combustion method and EDTA combustion method", Powder Technology 204 (2010), pp. 188-193.

\* cited by examiner

[Figure 1]
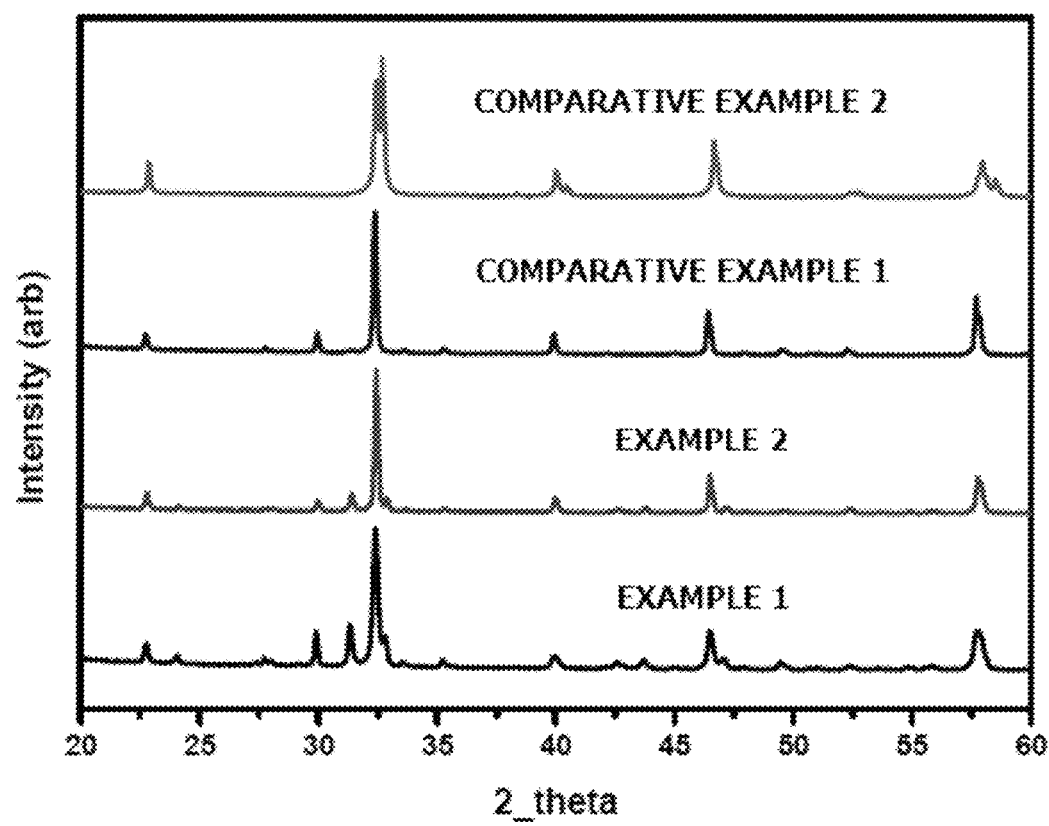

[Figure 2]
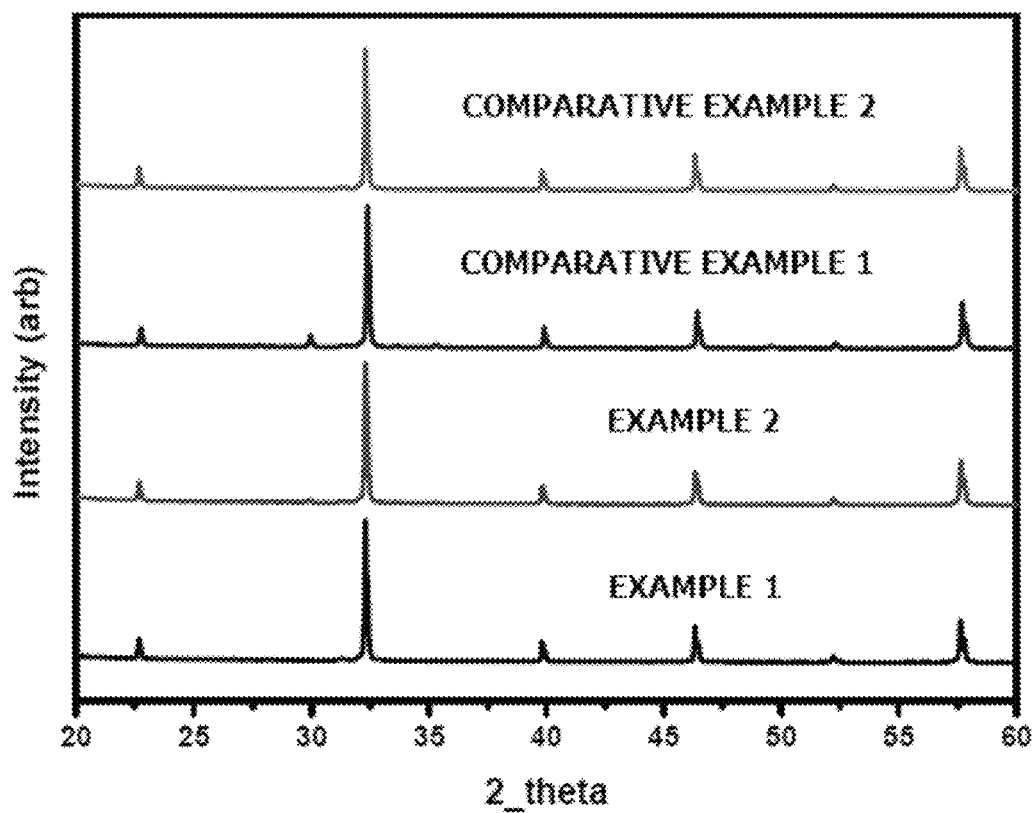

[Figure 3]
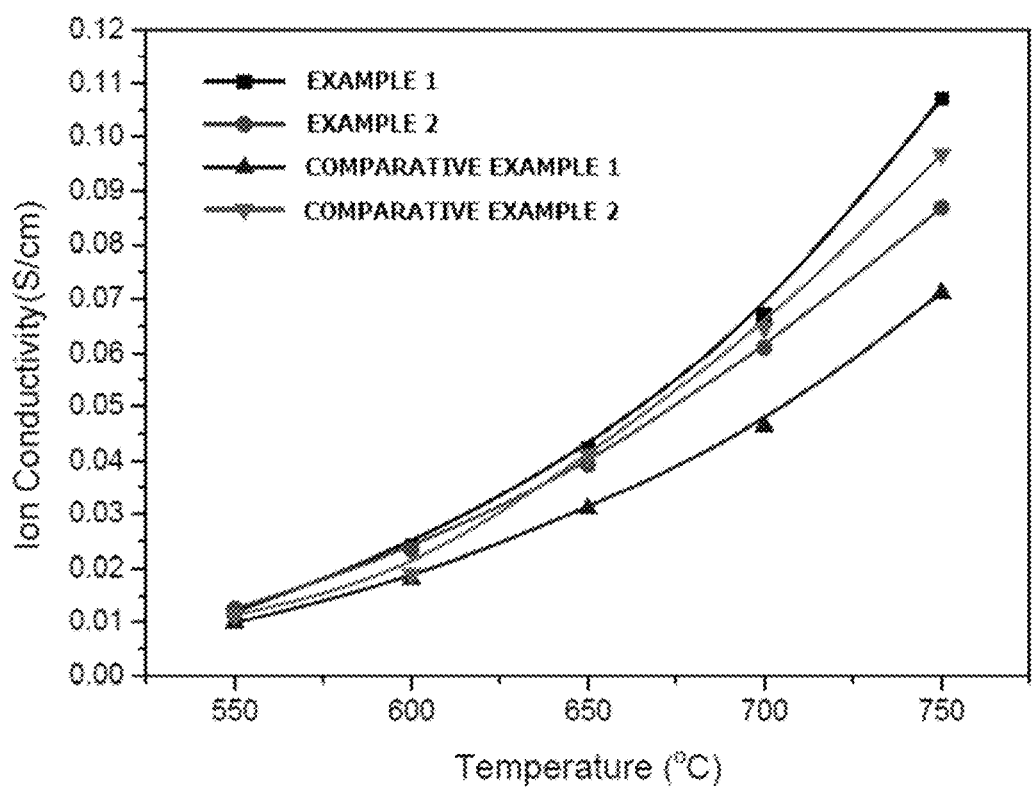

COMPOSITE METAL OXIDE PARTICLES AND METHOD FOR MANUFACTURING SAME

TECHNICAL FIELD

The present invention claims priority to and the benefit of Korean Patent Application No. 10-2014-0132099 filed in the Korean Intellectual Property Office on Sep. 30, 2014, the entire contents of which are incorporated herein by reference.

The present specification relates to composite metal oxide particles manufactured by reacting two or more metal oxides and a method for manufacturing the same.

BACKGROUND ART

Fuel cells can be classified into polymer electrolyte membrane fuel cells (PEMFCs), direct methanol fuel cells (DMFCs), alkaline fuel cells (AFCs), phosphoric acid fuel cells (PAFCs), molten carbonate fuel cells (MCFCs), solid oxide fuel cells (SOFCs), and the like depending on the types of electrolyte used and fuel used. Further, the working temperature of fuel cells and constituent part materials thereof vary depending on the type of electrolyte used.

Among them, a solid oxide fuel cell is a type of fuel cell which is an energy conversion device to directly convert chemical energy having hydrogen and oxygen into electric energy by electrochemical reactions, and has received attention as a next-generation energy conversion device due to many advantages in terms of high conversion efficiency and eco-friendliness.

In this case, it is preferred that an electrolyte membrane in the solid oxide fuel cell is thin and dense. Thus, studies for developing particles suitable as an electrolyte material for a solid oxide fuel cell have been conducted.

DETAILED DESCRIPTION OF THE INVENTION

Technical Problem

The present specification has been made in an effort to provide composite metal oxide particles manufactured by reacting two or more metal oxides and a method for manufacturing the same.

Technical Solution

The present specification provides composite metal oxide particles including: a first composite metal oxide represented by the following Chemical Formula 1; a second composite metal oxide represented by the following Chemical Formula 2; and a third composite metal oxide represented by the following Chemical Formula 3, in which a content of the second composite metal oxide is 30 wt % to 70 wt % and a content of the third composite metal oxide is 30 wt % to 70 wt %, based on a total weight of the second and third composite metal oxides.

$La_{1-x}Q_xGa_{1-y}Z_yO_{3-\delta}$ [Chemical Formula 1]

$LaQGaO_4$ [Chemical Formula 2]

$LaQGa_3O_7$ [Chemical Formula 3]

In Chemical Formulae 1 to 3, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

Further, the present specification provides a method for manufacturing composite metal oxide particles, the method including: synthesizing composite metal oxide particles which include: a first composite metal oxide represented by the following Chemical Formula 1; a second composite metal oxide represented by the following Chemical Formula 2; and a third composite metal oxide represented by the following Chemical Formula 3, in which a content of the second composite metal oxide is 30 wt % to 70 wt % and a content of the third composite metal oxide is 30 wt % to 70 wt %, based on a total weight of the second and third composite metal oxides.

$La_{1-x}Q_xGa_{1-y}Z_yO_{3-\delta}$ [Chemical Formula 1]

$LaQGaO_4$ [Chemical Formula 2]

$LaQGa_3O_7$ [Chemical Formula 3]

In Chemical Formulae 1 to 3, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

Advantageous Effects

Composite metal oxide particles according to the present specification have an advantage in that the composite metal oxide particles have small particle diameters and a uniform particle diameter distribution.

Since the composite metal oxide particles according to the present specification have small particle diameters and a uniform particle diameter distribution, a dense membrane may be manufactured by using the composite metal oxide particles.

In an exemplary embodiment of the present specification, when a membrane is coated with a composition including perovskite-type particles and crystalline secondary particles and then sintered, the crystalline secondary particles among composite metal oxide particles are modified into perovskite-type particles during the sintering process, and as a result, the manufactured membrane may be a membrane formed of single perovskite-type particles.

BRIEF DESCRIPTION OF DRAWINGS

FIG. 1 is an X-ray diffraction analysis graph of particles in Examples 1 and 2 and Comparative Examples 1 and 2.

FIG. 2 is an X-ray diffraction analysis graph of electrolyte membranes manufactured by using the particles in Examples 1 and 2 and Comparative Examples 1 and 2.

FIG. 3 is a graph illustrating the ion conductivity of the electrolyte membranes manufactured by using the particles in Examples 1 and 2 and Comparative Examples 1 and 2.

BEST MODE

Hereinafter, the present specification will be described in detail.

The present specification provides composite metal oxide particles including three or more composite metal oxides. Specifically, the composite metal oxide particles may include a first composite metal oxide, a second composite metal oxide, and a third composite metal oxide.

The composite metal oxide particles may include a first composite metal oxide represented by the following Chemical Formula 1.

$$La_{1-x}Q_xGa_{1-y}Z_yO_{3-\delta}$$ [Chemical Formula 1]

In Chemical Formula 1, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

In the present specification, the first composite metal oxide is a $LaGaO_3$-based compound, and the $LaGaO_3$-based compound includes a compound having an oxygen vacancy because a portion of at least one of trivalent lanthanum (La) and gallium (Ga) is substituted with a material having a different valence. Specifically, at least one of trivalent lanthanum and gallium in $LaGaO_3$ may be substituted with at least one metal of a monovalent metal, a divalent metal, and a tetravalent metal, and in this case, since lanthanum or gallium is not substituted when the difference between the atom radii is large, it is preferred that the metal which substitutes lanthanum or gallium has an atomic radius which is 90% or more and 110% or less of an atomic radius of lanthanum or gallium.

In Chemical Formula 1, Q may be at least one of strontium (Sr), calcium (Ca), potassium (K), barium (Ba), cerium (Ce), praseodymium (Pr), and neodymium (Nd).

In Chemical Formula 1, Z may be at least one of magnesium (Mg), lithium (Li), titanium (Ti), vanadium (V), chromium (Cr), manganese (Mn), cobalt (Co), nickel (Ni), zinc (Zn), and germanium (Ge).

In Chemical Formula 1, Q may be strontium. Specifically, the first composite metal oxide may be represented by the following Chemical Formula 4.

$$La_{1-x}Sr_xGa_{1-y}Z_yO_{3-\delta}$$ [Chemical Formula 4]

In Chemical Formula 4, Z is at least one of magnesium (Mg), lithium (Li), titanium (Ti), vanadium (V), chromium (Cr), manganese (Mn), cobalt (Co), nickel (Ni), zinc (Zn), and germanium (Ge), and $0<x<0.25$, $0<y<0.25$, and $0<\delta<0.5$.

In Chemical Formula 1, Q may be strontium and Z may be magnesium. Specifically, the first composite metal oxide may be represented by the following Chemical Formula 5.

$$La_{1-x}Sr_xGa_{1-y}Z_yO_{3-\delta}$$ [Chemical Formula 5]

In Chemical Formula 5, $0<x<0.25$, $0<y<0.25$, and $0<\delta<0.5$.

The first composite metal oxide may be a perovskite-type particle.

In the present specification, a perovskite-type oxide particle means a metal oxide particle with a cubic crystal structure, which exhibits not only properties of a non-conductor, a semi-conductor, and a conductor, but also a superconducting phenomenon.

In general, the perovskite-type oxide particle may be represented by $ABO_3$, and in this case, the A position is a vertex of a cubic unit, the B position is a center of the cubic unit, and these atoms have a coordination number of 12 together with oxygen. In this case, cations of any one or two or more elements selected among rare earth elements, alkaline earth metal elements, and transition elements may be positioned at A and/or B.

For example, one or two or more cations having a large size and a low valence are positioned at A, cations of a small size and a generally high valence are positioned at B, and metal atoms at the A and B positions are coordinated by six oxygen ions in an octahedral coordination.

The first composite metal oxide of the present specification is represented by lanthanum (La) and Q which correspond to A of $ABO_3$, and represented by gallium (Ga) and Z which correspond to B of $ABO_3$.

Further, when a portion of a trivalent metal is substituted with a divalent metal in a perovskite structure having a standard composition of $ABO_3$ (A and B are a trivalent metal), an oxygen vacancy occurs in order to adjust the charges to a neutral state, and as a result, among the oxygens in the particle, an oxygen smaller than a valence of 3 is present, and the oxygen is represented by "$O_{3-\delta}$".

The composite metal oxide particles are particles in which a first peak having a 2θ value appears at 32° or more and 33° or less of an X-ray diffraction analysis graph, and the first peak is a peak associated with the first composite metal oxide. Specifically, the first peak is a peak appearing due to a perovskite crystal structure.

The composite metal oxide particles may include a second composite metal oxide represented by the following Chemical Formula 2.

$$LaQGaO_4$$ [Chemical Formula 2]

In Chemical Formula 2, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom.

In Chemical Formula 2, Q is determined by Q of Chemical Formula 1 associated with the first composite metal oxide. Accordingly, in Chemical Formula 2, Q may be the same as Q of Chemical Formula 1 associated with the first composite metal oxide.

In Chemical Formula 2, Q may be at least one of strontium (Sr), calcium (Ca), potassium (K), barium (Ba), cerium (Ce), praseodymium (Pr), and neodymium (Nd).

For example, when Q is strontium in Chemical Formula 2, the second composite metal oxide may be $LaSrGaO_4$.

The second composite metal oxide may be a crystalline particle.

The composite metal oxide particles are particles in which a second peak having a 2θ value appears at 31° or more and less than 32° of an X-ray diffraction analysis graph, and the second peak is a peak associated with the second composite metal oxide. Specifically, the second peak is a peak appearing due to the crystalline structure of the second composite metal oxide.

The composite metal oxide particles may include a third composite metal oxide represented by the following Chemical Formula 3.

  [Chemical Formula 3]

In Chemical Formula 3, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom.

In Chemical Formula 3, Q is determined by Q of the first composite metal oxide. Accordingly, in Chemical Formula 2, Q may be the same as Q of the first composite metal oxide.

In Chemical Formula 3, Q may be at least one of strontium (Sr), calcium (Ca), potassium (K), barium (Ba), cerium (Ce), praseodymium (Pr), and neodymium (Nd).

For example, when Q is strontium in Chemical Formula 3, the third composite metal oxide may be $LaSrGa_3O_7$.

The third composite metal oxide may be a crystalline particle.

The composite metal oxide particles are particles in which a second peak having a 2θ value at 31° or more and less than 32° of an X-ray diffraction analysis graph and a third peak having a 2θ value at 29.5° or more and 30.5° or less of the graph appear, and the second and third peaks are peaks associated with the third composite metal oxide. Specifically, the second and third peaks are peaks appearing due to the crystalline structure of the third composite metal oxide.

The composite metal oxide particles may include a first composite metal oxide, a second composite metal oxide, and a third composite metal oxide.

An exemplary embodiment of the present specification provides composite metal oxide particles in which a content of the second composite metal oxide is 30 wt % to 70 wt % and a content of the third composite metal oxide is 30 wt % to 70 wt %, based on a total weight of the second and third composite metal oxides.

Specifically, a content of the second composite metal oxide may be 30 wt % to 60 wt % and a content of the third composite metal oxide may be 40 wt % to 70 wt %, based on a total weight of the second and third composite metal oxides.

More specifically, a content of the second composite metal oxide may be 30 wt % to 50 wt % and a content of the third composite metal oxide may be 50 wt % to 70 wt %, based on a total weight of the second and third composite metal oxides.

The first composite metal oxide may be a perovskite-type particle, and the second and third composite metal oxides may be a secondary phase which is a crystalline particle.

The content of the second and third composite metal oxides which are secondary phases may be 5 wt % or more and 30 wt % or less, specifically, 10 wt % or more and 20 wt % or less, based on the total weight of the composite metal oxide particles.

When a membrane manufactured by using a composition including composite metal oxide particles is sintered, crystalline secondary particles composed of the composite metal oxides represented by Chemical Formulae 2 and 3 may be modified into perovskite-type particles. In this case, when the stoichiometric ratio of the composite metal oxide represented by Chemical Formula 2 to the composite metal oxide represented by Chemical Formula 3, which are present in the composite metal oxide particles, is appropriately adjusted, it is possible to manufacture a membrane which is composed of single perovskite-type particles together with the composite metal oxide represented by Chemical Formula 1 because all the crystalline secondary particles composed of the composite metal oxides represented by Chemical Formulae 2 and 3 are modified into perovskite-type particles.

The composite metal oxide particles may be particles in which a first peak having a 2θ value at 32° or more and 33° or less of an X-ray diffraction analysis graph, a second peak having a 2θ value at 31° or more and less than 32° of the graph, and a third peak having a 2θ value at 29.5° or more and 30.5° or less of the graph appear.

A percentage of an intensity of the third peak may be 30% or more and 70% or less based on an intensity of the second peak. Specifically, the percentage of the intensity of the third peak may be 40% or more and 70% or less based on the intensity of the second peak, and more specifically, the percentage of the intensity of the third peak may be 50% or more and 70% or less based on the intensity of the second peak.

Here, the first peak is a peak associated with the first composite metal oxide, the second peak is a peak associated with the second and third composite metal oxides, and the third peak is a peak associated with the third composite metal oxide.

The composite metal oxide particles may have a D50 of 6 μm or less. In this case, the composite metal oxide particles have a small particle diameter, so that there is an advantage in that a process of splitting particles by a ball mill, and the like to make particles small may be omitted, or a target particle diameter may be easily made.

In an accumulation distribution diagram of particle diameters, a particle diameter having a 10% area from the largest particle diameter is represented by D10 based on the total area of the graph, a particle diameter having a 50% area from the largest particle diameter is represented by D50 based on the total area of the graph, and a particle diameter having a 90% area from the largest particle diameter is represented by D90 based on the total area of the graph. In other words, when the graph is divided into 10 equal parts based on the area of the accumulation distribution diagram of particle diameters, D10, D50, and D90 represent a size of particle corresponding to the positions of 1/10, 5/10, and 9/10, respectively. In this case, D50 in the present specification means an average particle size of particles.

A membrane may be manufactured by using a composition including the composite metal oxide particles of the present specification. Since the composite metal oxide particles according to the present specification have small particle diameters and a uniform particle diameter distribution, a dense membrane may be manufactured by using the composite metal oxide particles.

In an exemplary embodiment of the present specification, when a membrane is coated with a composition including perovskite-type particles and the crystalline secondary particles, and then sintered, the crystalline secondary particles among composite metal oxide particles are modified into perovskite-type particles during the sintering process, and as a result, the manufactured membrane may be a membrane in which the crystalline secondary particles are removed and which is formed of one type of perovskite-type particle.

In the present specification, the crystalline secondary particles included in the composite metal oxide particles prior to manufacturing a membrane include composite metal oxides represented by Chemical Formulae 2 and 3. In this case, single perovskite-type particles may be formed together with the composite metal oxide represented by Chemical Formula 1 during the sintering process of the membrane by appropriately adjusting the stoichiometric ratio of the composite metal oxide represented by Chemical Formula 2 to the composite metal oxide represented by Chemical Formula 3, which are present in the composite metal oxide particles.

An electrolyte membrane may be manufactured by using a composition including the composite metal oxide particles of the present specification. Specifically, the electrolyte membrane manufactured by using a composition including the composite metal oxide particles may be a solid electrolyte membrane.

An electrode may be manufactured by using a composition including the composite metal oxide particles of the present specification. Depending on the type of battery applied, the electrode manufactured by using the composition including the composite metal oxide particles may be a cathode or an anode.

It is possible to provide a secondary battery including an electrolyte membrane manufactured by using a composition including the composite metal oxide particles of the present specification.

It is possible to provide a secondary battery including an electrode manufactured by using a composition including the composite metal oxide particles of the present specification. Specifically, it is possible to provide a secondary battery including a cathode and/or an anode manufactured by using a composition including the composite metal oxide particles of the present specification.

The shape of the secondary battery is not limited, and may be, for example, a coin-type, a flat plate-type, a cylinder-type, a cone-type, a button-type, a sheet-type, or a laminate-type.

The secondary battery is not particularly limited as long as the battery includes an electrolyte membrane or an electrode manufactured by using a composition including the composite metal oxide particles of the present specification.

For example, the secondary battery may be a lithium secondary battery or a flow battery, and the like.

It is possible to provide a fuel cell including an electrolyte membrane manufactured by using a composition including the composite metal oxide particles of the present specification.

It is possible to provide a fuel cell including an electrode manufactured by using a composition including the composite metal oxide particles of the present specification. Specifically, it is possible to provide a fuel cell including a cathode and/or an anode manufactured by using a composition including the composite metal oxide particles of the present specification.

The type of fuel cell is not particularly limited, but may be, specifically, a solid oxide fuel cell.

The present specification provides a battery module including the secondary battery as a unit cell.

The present specification provides a battery module including the fuel cell as a unit cell.

The battery module may be formed by inserting a bipolar plate between secondary batteries according to one exemplary embodiment of the present application to stack the batteries.

The battery module may be specifically used as a power source for an electric vehicle, a hybrid electric vehicle, a plug-in hybrid electric vehicle, or a power storage device.

The present specification provides a method for manufacturing composite metal oxide particles, the method including: synthesizing composite metal oxide particles which include: a first composite metal oxide represented by the following Chemical Formula 1; a second composite metal oxide represented by the following Chemical Formula 2; and a third composite metal oxide represented by the following Chemical Formula 3, in which a content of the second composite metal oxide is 30 wt % to 70 wt % and a content of the third composite metal oxide is 30 wt % to 70 wt %, based on a total weight of the second and third composite metal oxides.

$La_{1-x}Q_xGa_{1-y}Z_yO_{3-\delta}$        [Chemical Formula 1]

$LaQGaO_4$        [Chemical Formula 2]

$LaQGa_3O_7$        [Chemical Formula 3]

In Chemical Formulae 1 to 3, Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

In Chemical Formulae 1 to 3, Q may be at least one of strontium (Sr), calcium (Ca), potassium (K), barium (Ba), cerium (Ce), praseodymium (Pr), and neodymium (Nd).

In Chemical Formula 1, Z may be at least one of magnesium (Mg), lithium (Li), titanium (Ti), vanadium (V), chromium (Cr), manganese (Mn), cobalt (Co), nickel (Ni), zinc (Zn), and germanium (Ge).

In the method for manufacturing composite metal oxide particles, the description on the first to third composite metal oxides may cite those described above.

The synthesizing of the composite metal oxide particles may include: preparing a mixture including a precursor of the composite metal oxide particles; warming the mixture; and synthesizing the precursor in the mixture into composite metal oxide particles.

The precursor of the composite metal oxide particles may include: any one of oxide of lanthanum, oxynitride of lanthanum, and sulfur oxide of lanthanum; any one of oxide of gallium, oxynitride of gallium, and sulfur oxide of gallium; any one of oxide of at least one metal of strontium (Sr), calcium (Ca), potassium (K), barium (Ba), cerium (Ce), praseodymium (Pr), and neodymium (Nd), oxynitride of the metal, and sulfur oxide of the metal; and any one of oxide of at least one metal of magnesium (Mg), lithium (Li), titanium (Ti), vanadium (V), chromium (Cr), manganese (Mn), cobalt (Co), nickel (Ni), zinc (Zn), and germanium (Ge), oxynitride of the metal, and sulfur oxide of the metal.

The precursor of the composite metal oxide particles may include: any one of oxide of lanthanum, oxynitride of lanthanum, and sulfur oxide of lanthanum; any one of oxide of gallium, oxynitride of gallium, and sulfur oxide of gallium; any one of oxide of strontium, oxynitride of strontium, and sulfur oxide of strontium; and oxide of magnesium, oxynitride of magnesium, and sulfur oxide of magnesium.

In the warming of the mixture, the final temperature for the warming may be less than 1,000° C. In this case, there is an advantage in that particles having small particle diameters and a uniform particle diameter distribution may be manufactured by synthesizing composite metal oxide particles at a relatively low temperature.

The lower the temperature at which composite metal oxide particles are synthesized is, the smaller the particle diameter of the composite metal oxide particles to be manufactured may be.

The composite metal oxide particles manufactured at a low temperature may include perovskite-type particles and a secondary phase of the perovskite-type particles. In other words, the presence of the secondary phase of perovskite-type particles in the manufactured composite metal oxide particles may mean that the composite metal oxide particles are manufactured at a low temperature. Here, the secondary phase of the perovskite-type particles means a crystal phase of the composite metal oxide before being synthesized as a perovskite-type structure.

The lower the temperature at which composite metal oxide particles are synthesized is, the higher the content of the secondary phase of the perovskite-type particles included in the composite metal oxide particles to be manufactured may be.

In the warming of the mixture, the final temperature for the warming may be 500° C. or more and less than 1,000° C., specifically, 500° C. or more and 950° C. or less, and 800° C. or more and 950° C. or less, if necessary.

MODE FOR INVENTION

Hereinafter, the present specification will be described in more detail through Examples. However, the following Examples are provided only for exemplifying the present specification, but are not intended to limit the present specification.

EXAMPLES

Example 1

For the LSGM perovskite phase, a glycine combustion method was used in order to form an LSGM single phase at a low temperature by synthesizing small particles via a combustion reaction. As starting raw materials, $La(NO_3)_3 \cdot 6H_2O$, $Ga(NO_3)_3 \cdot 9H_2O$, $Sr(NO_3)_2$, and $Mg(NO_3)_2 \cdot 6H_2O$ (Aldrich Chemical Co., U.S.A, 99.9%) at a predetermined molar ratio were weighed and dissolved in distilled water to manufacture an aqueous solution. Further, $C_2H_5NO_2$ (Aldrich Chemical Co.) was dissolved in distilled water to prepare an aqueous citric acid solution, and then the aqueous citric acid solution was mixed with the aforementioned aqueous metal salt solution while being stirred at normal temperature for 30 minutes. In this case, the molar ratio of the metal salt to glycine was fixed to 1:1.8 based on the stoichiometry. During the stirring process of the two aqueous solutions, an aqueous nitric acid solution ($HNO_3$—Junsei Chemical Co., Japan) as an oxidizing agent was added thereto.

After evaporating moisture while stirring the manufactured aqueous solution at 300° C., the viscosity was increased, and then the aqueous solution was slowly dried while being stirred at 90° C. At the time point when the viscosity of the gel was high as a result of evaporating all the moisture, a heating mantle was heated to 500° C. to induce a combustion reaction. After heating, the resulting products were put into a heating furnace, and were each heat-treated at 800° C. to manufacture composite metal oxide particles.

Example 2

Composite metal oxide particles were manufactured in the same manner as in Example 1, except that the heat treatment temperature was changed from 800° C. to 950° C.

Comparative Example 1

The molar ratio of the starting raw materials in Example 1 was adjusted, and composite metal oxide particles in which the amount of the secondary phase, which was not a perovskite phase, was not suitable for the stoichiometric ratio were synthesized by heat treatment at 1,500° C. Composite metal oxide particles were manufactured in the same manner as in Example 1, except that the molar ratio of the starting raw materials was adjusted such that the amount of the secondary phase was not suitable for the stoichiometric ratio, and the synthesis temperature was changed into 1,500° C. in Example 1.

Comparative Example 2

Composite metal oxide particles were manufactured in the same manner as in Example 1, except that the heat treatment temperature was changed from 800° C. to 1,500° C.

Experimental Example 1

X-Ray Diffraction Analysis of Particles

The 2θ was measured from 20° to 60° by using a D4 Endeavor apparatus manufactured by Bruker Corp., and was shown.

The composite metal oxide particles in Examples 1 and 2 and Comparative Examples 1 and 2 were subjected to an X-ray diffraction analysis in a powder state, and the results are illustrated in FIG. 1.

As illustrated in FIG. 1, it could be confirmed from the X-ray diffraction analysis graph that a first peak associated with the first composite metal oxide appeared at 32° or more and 33° or less, a second peak associated with the second and third composite metal oxides appeared at 31° or more and less than 32°, and a third peak associated with the third composite metal oxide appeared at 29.5° or more and 30.5° or less.

The percentage of the intensity of the third peak was 59.46% based on the intensity of the second peak in the X-ray diffraction analysis graph of Example 1.

The stoichiometric ratio of the second composite metal oxide to the third composite metal oxide, which are present in the composite metal oxide particles, is appropriately adjusted and the oxides are all modified into perovskite-type particles at the time of sintering an electrolyte membrane, and as a result, a membrane composed of single perovskite-type particles may be manufactured.

Meanwhile, in the case of Comparative Example 1, it can be seen that in an "$ABO_3$" structure of the perovskite phase, the raw material at the "B" position is added in an excessive amount, and as a result, even though the composite metal oxide particles are synthesized at a high temperature of 1,500° C., the molar ratio is not suitable for the stoichiometric ratio, and accordingly, the secondary phase of $SrLaGa_3O_7$ remains.

Experimental Example 2

X-Ray Diffraction Analysis of Electrolyte Membrane

The composite metal oxide particles in Examples 1 and 2 and Comparative Examples 1 and 2 were each placed in a carbide mold having a diameter of 20 mm, and pressurized at 2 ton to manufacture an electrolyte membrane in the form of a pellet. The electrolyte membrane was warmed to 1,500° C. at 5° C./min, and then the temperature was maintained for 3 hours to sinter the electrolyte.

The X-ray diffraction analysis of the manufactured electrolyte membrane was measured, and illustrated in FIG. 2. Through this, it can be seen that the second composite metal oxide and the third composite metal oxide, which are present in the composite metal oxide particles, are all modified into perovskite-type particles at the time of sintering an electrolyte membrane, and as a result, single perovskite-type particles are formed.

Experimental Example 3

Ion Conductivity

The ion conductivity was measured by using an impedance measurement apparatus manufactured by Solartron Metrology. In order to measure the ion conductivity, a 2 electrode 4 probe method using a disc pellet was used. For the EIS experimental conditions, the ion conductivity was calculated through a Nyquist plot exhibiting a real number value and an imaginary impedance value as a graph by sweeping a frequency region of $10^{-4}$ to $10^{2}$ to read each impedance value.

The disc pellet was manufactured by preparing a disc-type electrolyte pellet, sintering the electrolyte pellet at an electrolyte sintering temperature, printing a Pt electrode at both sides of the pellet, and sintering the electrolyte pellet again.

The ion conductivities in Examples 1 and 2 and Comparative Examples 1 and 2 were measured, and are illustrated in FIG. 3.

This shows that the ion conductivity of the electrolyte manufactured in Example 1 exhibits a performance which is equivalent to or better than the ion conductivity of the electrolyte manufactured in Comparative Example 2, which is synthesized as a single phase.

The invention claimed is:

1. Composite metal oxide particles comprising:
a first composite metal oxide represented by the following Chemical Formula 1;
a second composite metal oxide represented by the following Chemical Formula 2; and
a third composite metal oxide represented by the following Chemical Formula 3,
wherein a content of the second composite metal oxide is 30 wt % to 70 wt % and a content of the third composite metal oxide is 30 wt % to 70 wt %, based on a total weight of the second and third composite metal oxides,
wherein the composite metal oxide particles are particles in which a first peak having a 2θ value at 32° or more and 33° or less of an X-ray diffraction analysis graph, a second peak having a 2θ value at 31° or more and less than 32° of the graph, and a third peak having a 2θ value at 29.5° or more and 30.5° or less of the graph appear,
wherein the first peak is a peak associated with the first composite metal oxide,
wherein the second peak is a peak associated with the second and third composite metal oxides,
wherein the third peak is a peak associated with the third composite metal oxide, and
wherein a percentage of an intensity of the third peak is 30% or more and 70% or less based on an intensity of the second peak:

$La_{1-x}Q_xGa_{1-y}Z_yO_{3-\delta}$     [Chemical Formula 1]

$LaQGaO_4$     [Chemical Formula 2]

$LaZGa_3O_7$     [Chemical Formula 3]

in Chemical Formulae 1 to 3,
Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom,
Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and
$0<x<0.25$, $0<y<0.25$, and $0<\delta<0.5$.

2. The composite metal oxide particles of claim 1, wherein in Chemical Formulae 1 to 3, Q is strontium.

3. The composite metal oxide particles of claim 1, wherein in Chemical Formulae 1 to 3, Q is strontium and Z is magnesium.

4. The composite metal oxide particles of claim 1, wherein the composite metal oxide particles have an average particle diameter of 6 μm or less.

5. The composite metal oxide particles of claim 1, wherein the first composite metal oxide is a perovskite-type particle.

6. The composite metal oxide particles of claim 1, wherein the second and third composite metal oxides are crystalline particles.

7. A method for manufacturing composite metal oxide particles, the method comprising:
synthesizing composite metal oxide particles which comprise: a first composite metal oxide represented by the following Chemical Formula 1; a second composite metal oxide represented by the following Chemical Formula 2; and a third composite metal oxide represented by the following Chemical Formula 3,
wherein the synthesizing of the composite metal oxide particles comprises: preparing a mixture including a precursor of the composite metal oxide particles; warming the mixture; and synthesizing the precursor in the mixture into composite metal oxide particles,
wherein in the warming of the mixture, a final temperature for the warming is less than 1,000° C.,
wherein a content of the second composite metal oxide is 30 wt % to 70 wt % and a content of the third composite metal oxide is 30 wt % to 70 wt %, based on a total weight of the second and third composite metal oxides,
wherein the composite metal oxide particles are particles in which a first peak having a 2θ value at 32° or more and 33° or less of an X-ray diffraction analysis graph, a second peak having a 2θ value at 31° or more and less than 32° of the graph, and a third peak having a 2θ value at 29.5° or more and 30.5° or less of the graph appear, wherein the first peak is a peak associated with the first composite metal oxide, wherein the second peak is a peak associated with the second and third composite metal oxides, wherein the third peak is a peak associated with the third composite metal oxide, and wherein a percentage of an intensity of the third peak is 30% or more and 70% or less based on an intensity of the second peak:

$$La_{1-x}Q_xGa_{1-y}Z_yO_{3-\delta}$$ [Chemical Formula 1]

$$LaQGaO_4$$ [Chemical Formula 2]

$$LaQGa_3O_7$$ [Chemical Formula 3]

in Chemical Formulae 1 to 3,

Q is at least one of a monovalent metal having a radius which is 90% or more and 110% or less of a radius of a lanthanum atom, a divalent metal having a radius which is 90% or more and 110% or less of a radius of a lanthanum atom, and a tetravalent metal having a radius which is 90% or more and 110% or less of a radius of a lanthanum atom, Z is at least one of a monovalent metal having a radius which is 90% or more and 110% or less of a radius of a gallium atom, a divalent metal having a radius which is 90% or more and 110% or less of a radius of a gallium atom, and a tetravalent metal having a radius which is 90% or more and 110% or less of a radius of a gallium atom, and $0<x<0.25$, $0<y<0.25$, and $0<\delta<0.5$.

8. The method of claim 7, wherein the precursor of the composite metal oxide particles comprises:

any one of oxide of lanthanum, oxynitride of lanthanum, and sulfur oxide of lanthanum;

any one of oxide of gallium, oxynitride of gallium, and sulfur oxide of gallium;

any one of oxide of at least one metal among strontium (Sr), calcium (Ca), potassium (K), barium (Ba), cerium (Ce), praseodymium (Pr), and neodymium (Nd), oxynitride of the metal, and sulfur oxide of the metal; and any one of oxide of at least one metal of magnesium (Mg), lithium (Li), titanium (Ti), vanadium (V), chromium (Cr), manganese (Mn), cobalt (Co), nickel (Ni), zinc (Zn), and germanium (Ge), oxynitride of the metal, and sulfur oxide of the metal.

9. The method of claim 8, wherein the precursor of the composite metal oxide particles comprises:

any one of oxide of lanthanum, oxynitride of lanthanum, and sulfur oxide of lanthanum;

any one of oxide of gallium, oxynitride of gallium, and sulfur oxide of gallium;

any one of oxide of strontium, oxynitride of strontium, and sulfur oxide of strontium; and any one of oxide of magnesium, oxynitride of magnesium, and sulfur oxide of magnesium.

* * * * *